US012431655B2

(12) United States Patent
Li

(10) Patent No.: US 12,431,655 B2
(45) Date of Patent: Sep. 30, 2025

(54) ELECTRICAL CONNECTOR WITH TERMINALS EACH HAVING A FIXING PORTION

(71) Applicant: Molex, LLC, Lisle, IL (US)

(72) Inventor: Guo-Li Li, Shanghai (CN)

(73) Assignee: Molex, LLC, Lisle, IL (US)

( * ) Notice: Subject to any disclaimer, the term of this patent is extended or adjusted under 35 U.S.C. 154(b) by 352 days.

(21) Appl. No.: 18/114,288

(22) Filed: Feb. 27, 2023

(65) Prior Publication Data

US 2023/0291140 A1 Sep. 14, 2023

(30) Foreign Application Priority Data

Mar. 14, 2022 (CN) ........................ 202210247888.3

(51) Int. Cl.
*H01R 13/42* (2006.01)
*H01R 13/422* (2006.01)
*H01R 107/00* (2006.01)

(52) U.S. Cl.
CPC ..... *H01R 13/4223* (2013.01); *H01R 2107/00* (2013.01)

(58) Field of Classification Search
CPC .................................................. H01R 13/4362
USPC .................................................. 439/752, 595
See application file for complete search history.

(56) References Cited

U.S. PATENT DOCUMENTS 5,569,055 A * 10/1996 Yamanashi ........ H01R 13/4368 439/752
5,647,774 A * 7/1997 Yamamoto ......... H01R 13/4361 439/752
5,716,235 A * 2/1998 Endo .................... H01R 13/436 439/752
5,851,128 A * 12/1998 Nakata ................. H01R 13/434 439/752
6,755,696 B1 6/2004 Ko
7,179,136 B1 2/2007 Morello
10,381,775 B2 * 8/2019 Zheng .................. H01R 13/428
(Continued)

FOREIGN PATENT DOCUMENTS

CN 207517937 U 6/2018
CN 111262066 B 10/2021
(Continued)

*Primary Examiner* — Phuong K Dinh

(57) ABSTRACT

An electrical connector includes: an insulative housing, an interior of the insulative housing is provided with a plurality of terminal receiving cavities which penetrate along a front-rear direction, two sides of each terminal receiving cavity each are provided with a fixing slot; a plurality of conductive terminals respectively correspondingly mounted in the plurality of terminal receiving cavities; each conductive terminal includes a fixing portion, a mating portion which extends forwardly from the fixing portion and a crimping connection portion and a crimping wire portion which extend rearwardly from the fixing portion; two sides of the fixing portion each are provided with a vertical extending piece which extends upwardly, a fixing wing horizontally bends outwardly from an upper end of each vertical extending piece, the fixing wing is correspondingly fixed in the fixing slot. The electrical connector may promote stability of the conductive terminal, reliability of the electrical connector is promoted when the electrical connector mates with the mating connector.

10 Claims, 7 Drawing Sheets

(56) References Cited

U.S. PATENT DOCUMENTS

| | | | | |
|---|---|---|---|---|
| 12,191,603 | B2 * | 1/2025 | Pan | H01R 13/639 |
| 2022/0021132 | A1 * | 1/2022 | Chen | H01R 13/4223 |

FOREIGN PATENT DOCUMENTS

| | | | |
|---|---|---|---|
| CN | 214625471 | U | 11/2021 |
| JP | 2019023959 | A | 2/2019 |
| KR | 20200095397 | A | 8/2020 |

* cited by examiner

ELECTRICAL CONNECTOR WITH TERMINALS EACH HAVING A FIXING PORTION

RELATED APPLICATIONS

This application claims priority to Chinese Patent Application No. 202210247888.3, filed Mar. 14, 2022, which is incorporated herein by reference in its entirety.

TECHNICAL FIELD

The present disclosure relates to the technical field of connectors, and particularly relates to an electrical connector which may promote stability of a terminal.

BACKGROUND

Chinese invention patent application issuance publication No. CN111262066B discloses a power connector, which includes an insulative housing and a terminal. The insulative housing defines a terminal receiving groove therein and includes a stopping wall. The terminal is positioned in the terminal receiving groove, and includes a mating portion, a stopping portion and a wire connecting portion. The stopping portion abuts against the stopping wall and includes a first horizontal portion and a second horizontal portion. The first horizontal portion includes a first front edge. The second horizontal portion includes a second front edge. A part of a front end of the first horizontal portion and a part of a front end of the second horizontal portion are cut off, so when the terminal crimps a wire, the first front edge and the second front edge do not splay forwardly to protrude, but are parallel to each other or respectively extend rearwardly, which thus can avoid a situation that the stopping portion early abuts against the stopping wall due to such the protruding.

In an embodiment of the power connector, the insulative housing is provided with a rib portion, the terminal is provided with a first crimping arm and a second crimping arm, a first middle portion of the first crimping arm and a second middle portion of the second crimping arm together crimp the rib portion of the insulative housing so as to fix the terminal in the insulative housing. The insulative housing includes two side walls, the two side walls each have a stopping block to bear the terminal, which further fixes a position of the terminal in the insulative housing in an up-down direction.

In this solution, the two stopping blocks at the two sides of the insulative housing respectively bear two sides of a bottom of the terminal, but the two sides of the bottom of the terminal generally are round corner structures, in addition, such a terminal is not provided with a fixing structure which prevents the terminal from shaking up and down, so when such a power connector mates with a mating connector, a problem that the terminal shakes up and down due to an external force from the mating connector easily occurs, and needs to be further improved.

SUMMARY

A technical problem to be solved by the present disclosure is to provide an electrical connector which may promote stability of a terminal so as to overcome a deficiency existing in the prior art.

A technical solution employed by the present disclosure is as follows: an electrical connector comprises: an insulative housing, an interior of the insulative housing is provided with a plurality of terminal receiving cavities which penetrate along a front-rear direction, two sides of each terminal receiving cavity are provided with a fixing slot respectively; a plurality of conductive terminals respectively mounted in the terminal receiving cavities; each conductive terminal comprises a fixing portion, a mating portion which extends forwardly from the fixing portion and a crimping connection portion and a crimping wire portion which extend rearwardly from the fixing portion; two sides of the fixing portion each are provided with a vertical extending piece which extends upwardly, a fixing wing horizontally bends outwardly from an upper end of each vertical extending piece, the fixing wing correspondingly is fixed in the fixing slot.

In comparison with the prior art, the present disclosure at least has the following advantages: in the electrical connector, a fixing wing horizontally extends outwardly from each of two sides of the fixing portion of the conductive terminal, and the two sides of the terminal receiving cavity of the insulative housing each are correspondingly provided with a fixing slot, the fixing wing is fixed in the fixing slot, which fixes the position of the conductive terminal in the insulative housing, particularly limits that the conductive terminal cannot move in the up-down direction, so that the conductive terminal is prevented from shaking (particularly along the up-down direction) when the conductive terminal mates with the mating connector, stability of the conductive terminal is promoted, reliability of the electrical connector is promoted when the electrical connector mates with the mating connector.

DETAILED DESCRIPTION OF THE PREFERRED EMBODIMENTS

Figure 1:
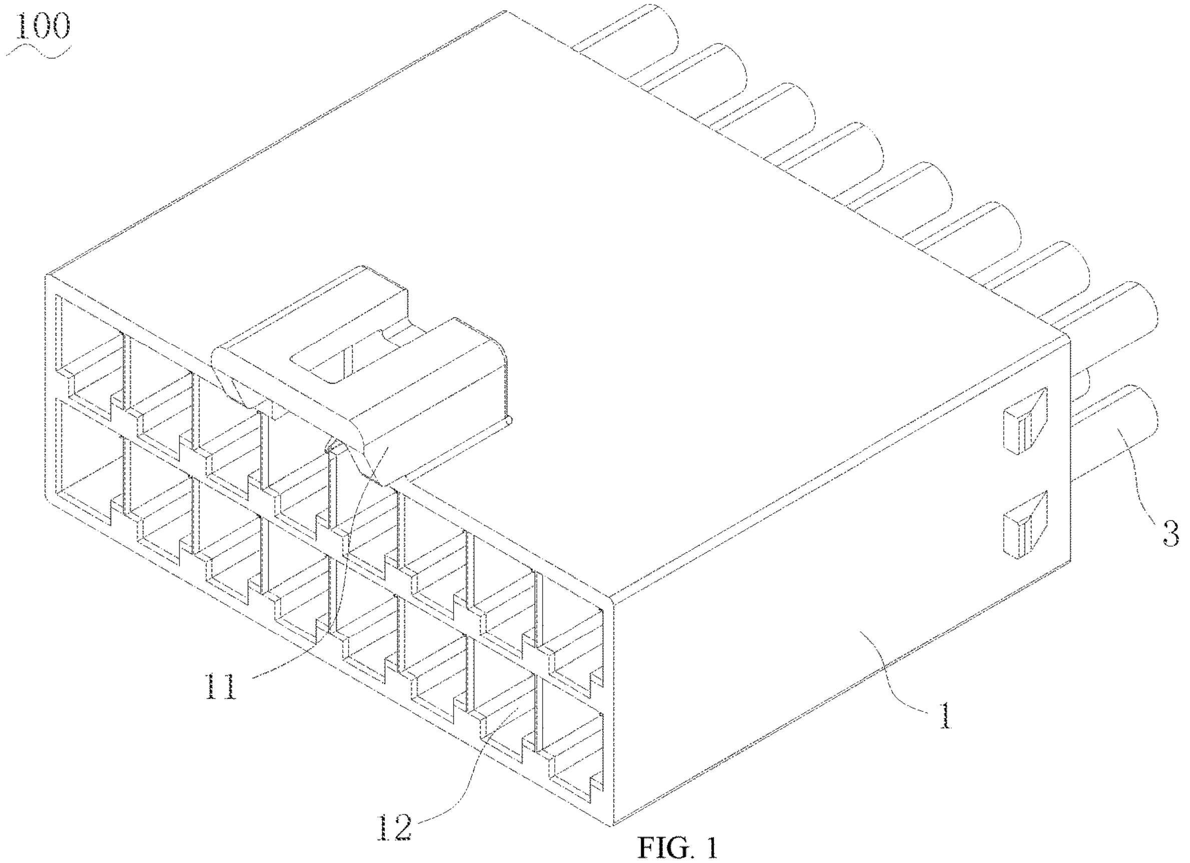
FIG. 1 is a perspective view of an electrical connector of a preferred embodiment of the present disclosure.
Figure 2:
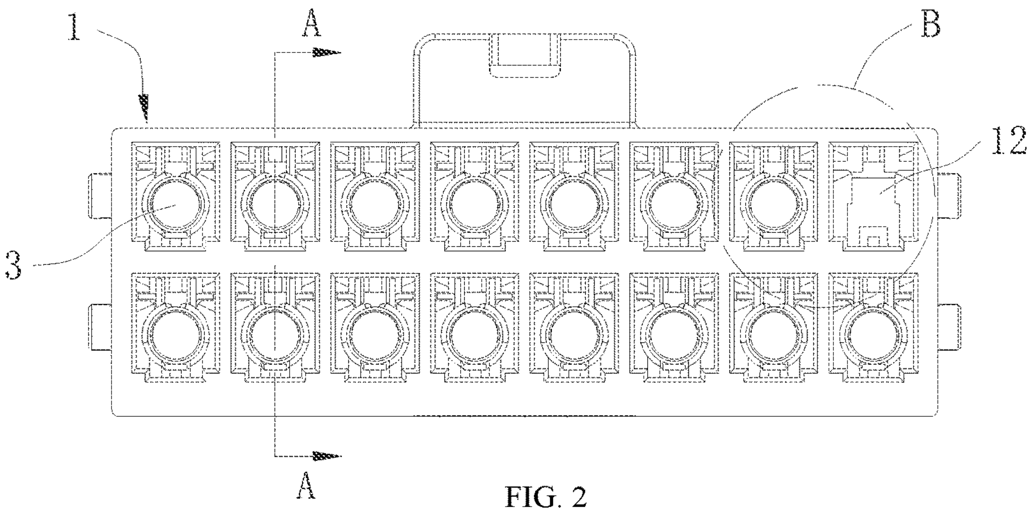
FIG. 2 is a rear view of the electrical connector of FIG. 1 with one of conductive terminals and a conductive wire omitted.

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features. While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Hereinafter, preferred embodiments of the present disclosure are further described in detail in combination with the figures of the present disclosure.

Referring to FIG. 1 to FIG. 7, an electrical connector 100 of the present preferred embodiment mainly includes an insulative housing 1, a plurality of conductive terminals 2 mounted in the insulative housing 1 and a plurality of conductive wires 3 correspondingly connected to rear ends of the plurality of conductive terminals 2.

The insulative housing 1 is integrally formed by injection molding with an insulative material. A main body structure of the insulative housing 1 substantially is rectangular, and a locking protrusion 11 protrudes from an upper surface of the main body structure. When the electrical connector 100 mates with an external mating connector, the locking protrusion 11 may lock with the mating connector.

An interior of the insulative housing 1 are provided with a plurality of terminal receiving cavities 12 which penetrate the insulative housing 1 along a front-rear direction. In the present embodiment, the plurality of terminal receiving cavities 12 are distributed as an upper row and a lower row, the terminal receiving cavities 12 of each row are arranged along a left-right direction. Here, the number and arrangement manner of the plurality of terminal receiving cavities 12 may be set as practical requirement, so specific limitation is not given here.

Figure 3:
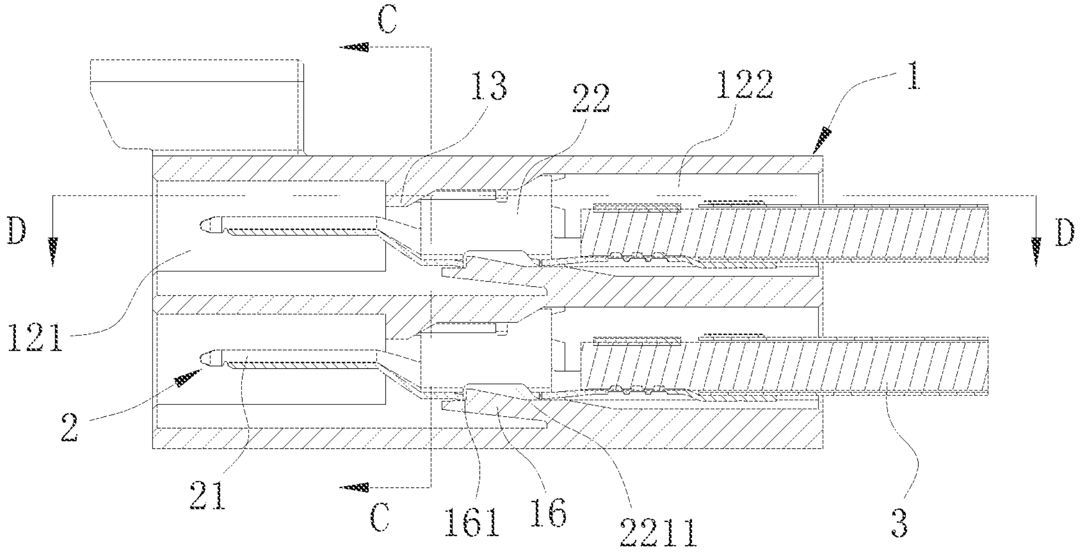
FIG. 3 is a cross sectional view taken along a line A-A of FIG. 2.
Figure 6:
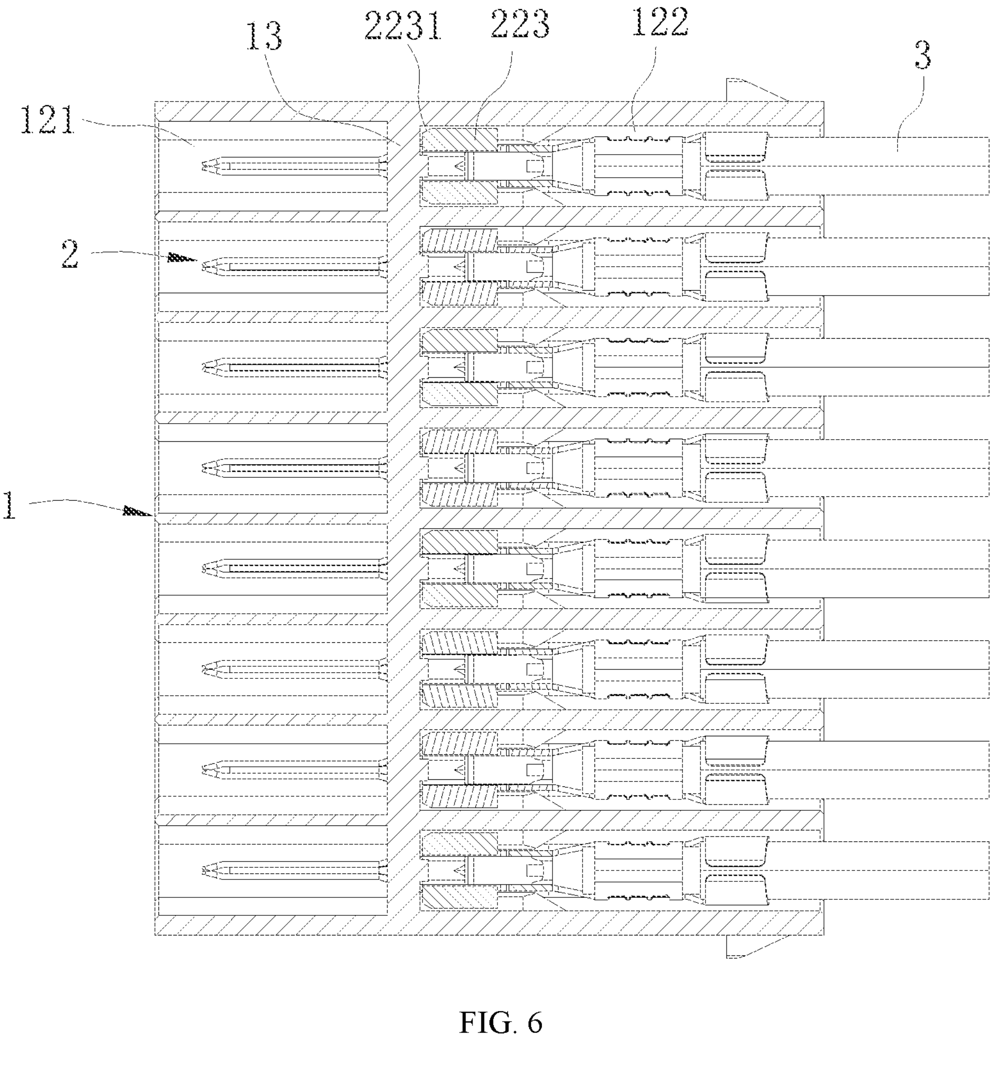
FIG. 6 is a cross sectional view taken along a line D-D of FIG. 3.

Referring to FIG. 3 and FIG. 6, an inner wall of the terminal receiving cavity 12 is provided with a stopping wall 13 which protrudes so that the terminal receiving cavity 12 is divided into a mating cavity 121 which is positioned in the front of the terminal receiving cavity 12 and a wire connecting cavity 122 which is positioned at the rear of the terminal receiving cavity 12. The mating cavity 121 and the wire connecting cavity 122 are communicated with each other along the front-rear direction. The mating cavity 121 allows the mating connector (not shown) to insert into so as to mate with the electrical connector 100, the wire connecting cavity 122 may receive a front end of the conductive wire 3.

The insulative housing 1 is further provided with an elastic fixing arm 16 which correspondingly protrudes upwardly from a bottom of the terminal receiving cavity 12. The elastic fixing arm 16 obliquely extends upwardly from the rear to the front, a rear end of the elastic fixing arm 16 and a lower wall of the terminal receiving cavity 12 are jointed together, a front end of the elastic fixing arm 16 is cantilevered in the terminal receiving cavity 12, so that the front end of the elastic fixing arm 16 may elastically move up and down. Here, the front end of the elastic fixing arm 16 is provided with a fixing notch 161.

Figure 4:
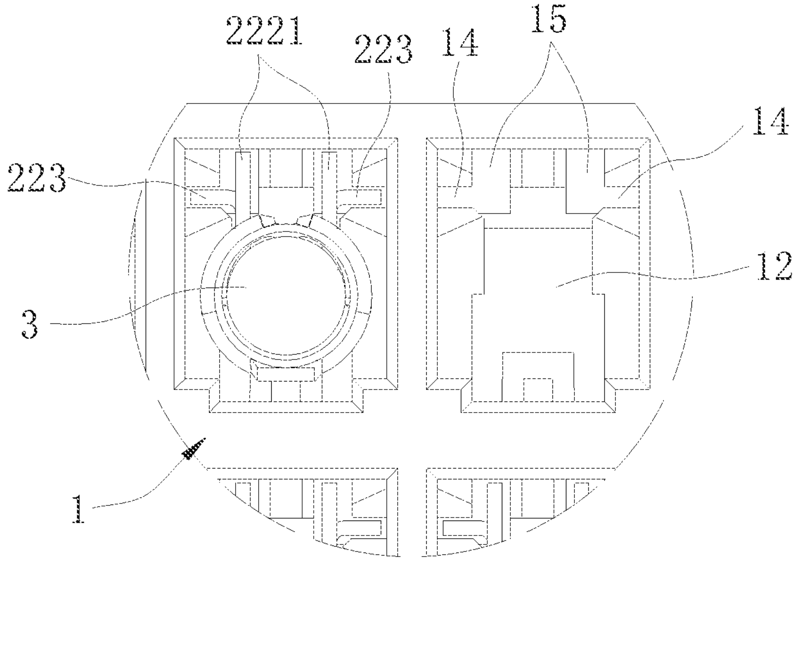
FIG. 4 is a partially enlarged view indicated by a dotted-line frame B of FIG. 2.

Referring to FIG. 4, two sides of each terminal receiving cavity 12 each are provided with a fixing slot 14, the fixing slot 14 extends along a horizontal direction, a rear end of the fixing slot 14 and a side of the fixing slot 14 toward the other fixing slot 14 are opened, the two fixing slots 14 at the two sides of each terminal receiving cavity 12 are flush with each other in a height direction. A front end of the fixing slot 14 is blocked by the stopping wall 13, see FIGS. 5 and 6, the rear end of the fixing slot 14 penetrates a rear end surface of the insulative housing 1.

Furthermore, the insulative housing 1 is further provided with two receiving grooves 15 which are at an upper side of the terminal receiving cavity 12, the two receiving grooves 15 extend along the up-down direction parallelly, and a rear side and a lower side of the receiving groove 15 are opened.

Figure 8:
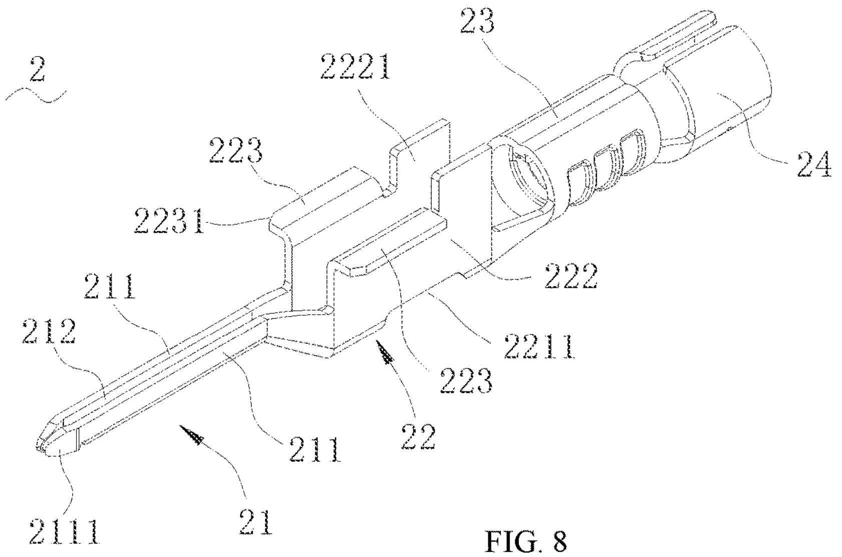
FIG. 8 and FIG. 9 are perspective views of a conductive terminal of FIG. 7 viewed from different angles.
Figure 9:
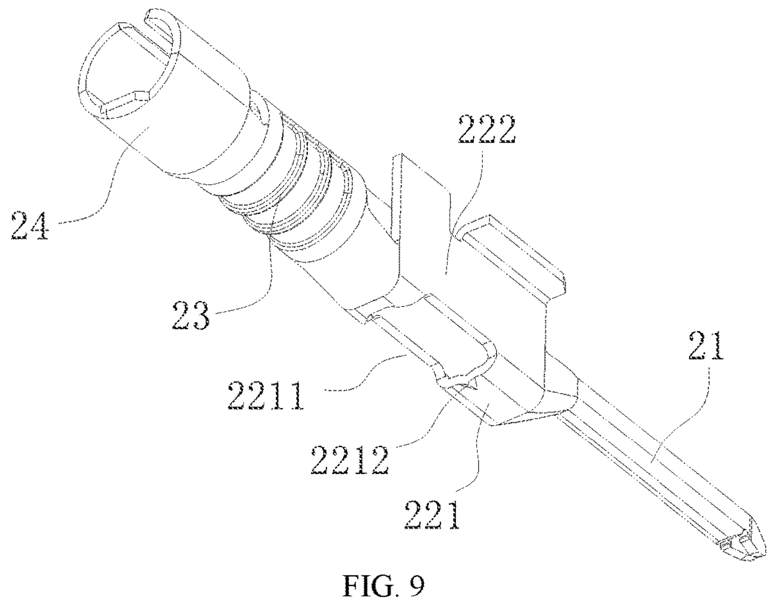
Figure 10:
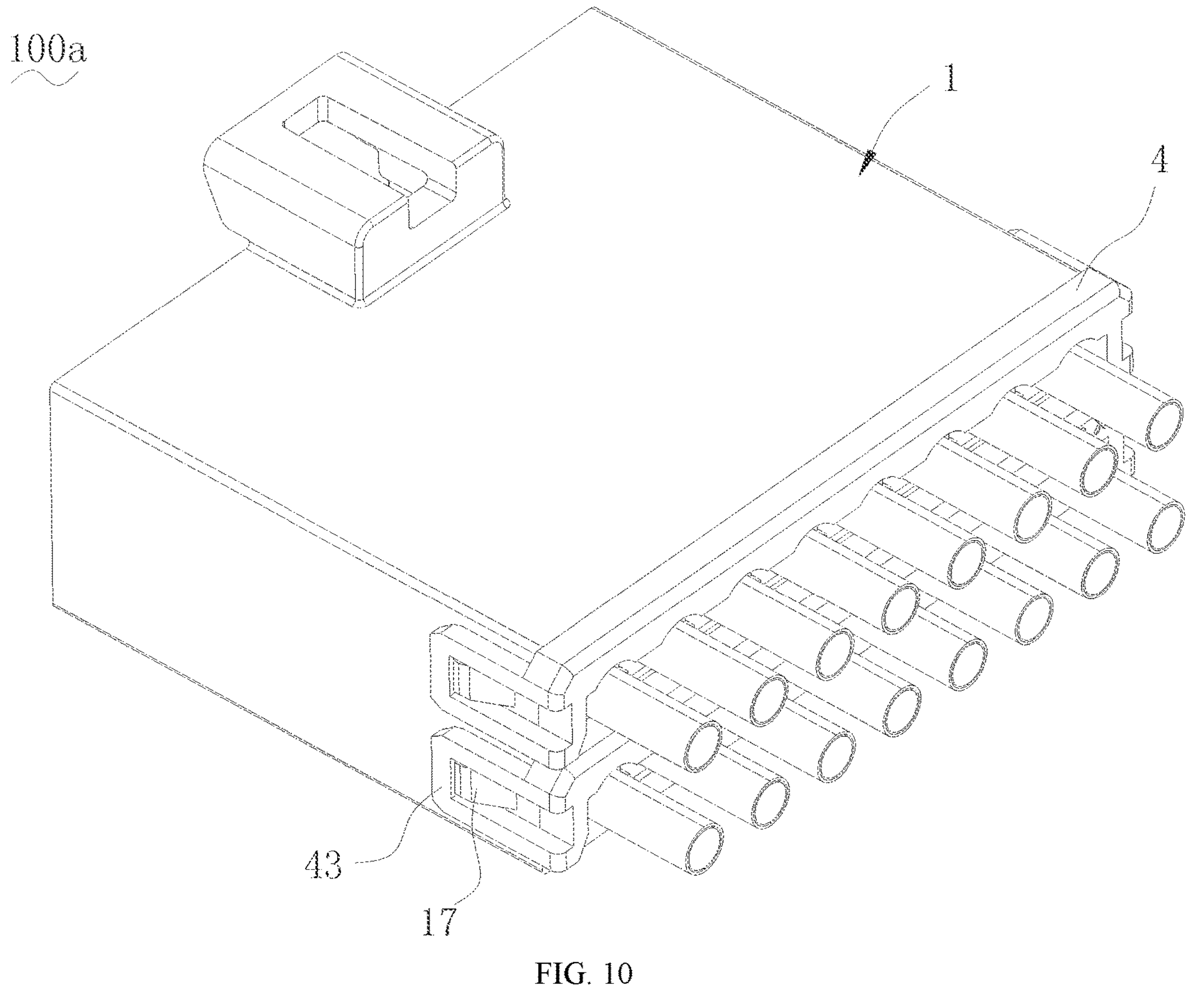
FIG. 10 is a perspective view of an electrical connector of the present disclosure in which a terminal position assurance member is added on a basis of a structure of the electrical connector of FIG. 1.

Referring to FIG. 8 and FIG. 9, the conductive terminal 2 is formed by stamping a metal plate. The conductive terminal 2 includes a fixing portion 22, a mating portion 21 which extends forwardly from the fixing portion 22 and a crimping connection portion 23 and a crimping wire portion 24 which subsequently extend rearwardly from the fixing portion 22.

The fixing portion 22 is U-shaped, and mainly includes a bottom connecting piece 221 which extends horizontally and two vertical extending pieces 222 which perpendicularly bend from two sides of the bottom connecting piece 221 respectively and extend upwardly.

A middle portion of the bottom connecting piece 221 is provided with a fixing opening 2211, the fixing opening 2211 is connected with the two vertical extending pieces 222. The bottom connecting piece 221 is further provided with a strengthening protrusion 2212 which is positioned in front of the fixing opening 2211 and protrudes downwardly, the strengthening protrusion 2212 is adjacent to the fixing opening 2211.

The two vertical extending pieces 222 face each other and are spaced apart from each other along the left-right direction. Each vertical extending piece 222 is provided along a vertical direction and extends along the front-rear direction. A fixing wing 223 horizontally bends outwardly from a front portion of an upper end of each vertical extending piece 222, the two fixing wings 223 oppositely bend outwardly and away from each other from the two vertical extending pieces 222. The two fixing wings 223 are substantially positioned in the same horizontal plane, an oblique surface 2231 is provided between a front edge and an outer side edge of each fixing wing 223 and is inclined rearwardly, the oblique surface 2231 may be formed by cutting off a front corner of the fixing wing 223. A rear portion 2221 of each vertical extending piece 222 continuously extends vertically and upwardly, here an upper edge of the rear portion 2221 of the vertical extending piece 222 is higher than an upper surface of the fixing wing 223.

The mating portion 21 is used to mate with the mating connector. In the present embodiment, the mating portion 21 is a hollow needle-shaped structure formed by stamping a plate material and surrounding a hollow. The mating portion 21 includes two mating arms 211 which respectively extend forwardly from the two vertical extending pieces 222, each mating arm 211 bends obliquely from the vertical extending piece 222 toward the other mating arm 211 firstly and then extends forwardly in parallel with the other mating arm 211, a tip of each mating arm 211 is further provided with a guiding distal end 2111 which extends obliquely toward the other mating arm 211, so that each mating arm 211 may smoothly insert into the mating connector. The two mating arms 211 are connected together at bottom sides of the two mating arms 211 and are provided with an opened groove 212 therebetween at top sides of the two mating arms 211.

Figure 7:
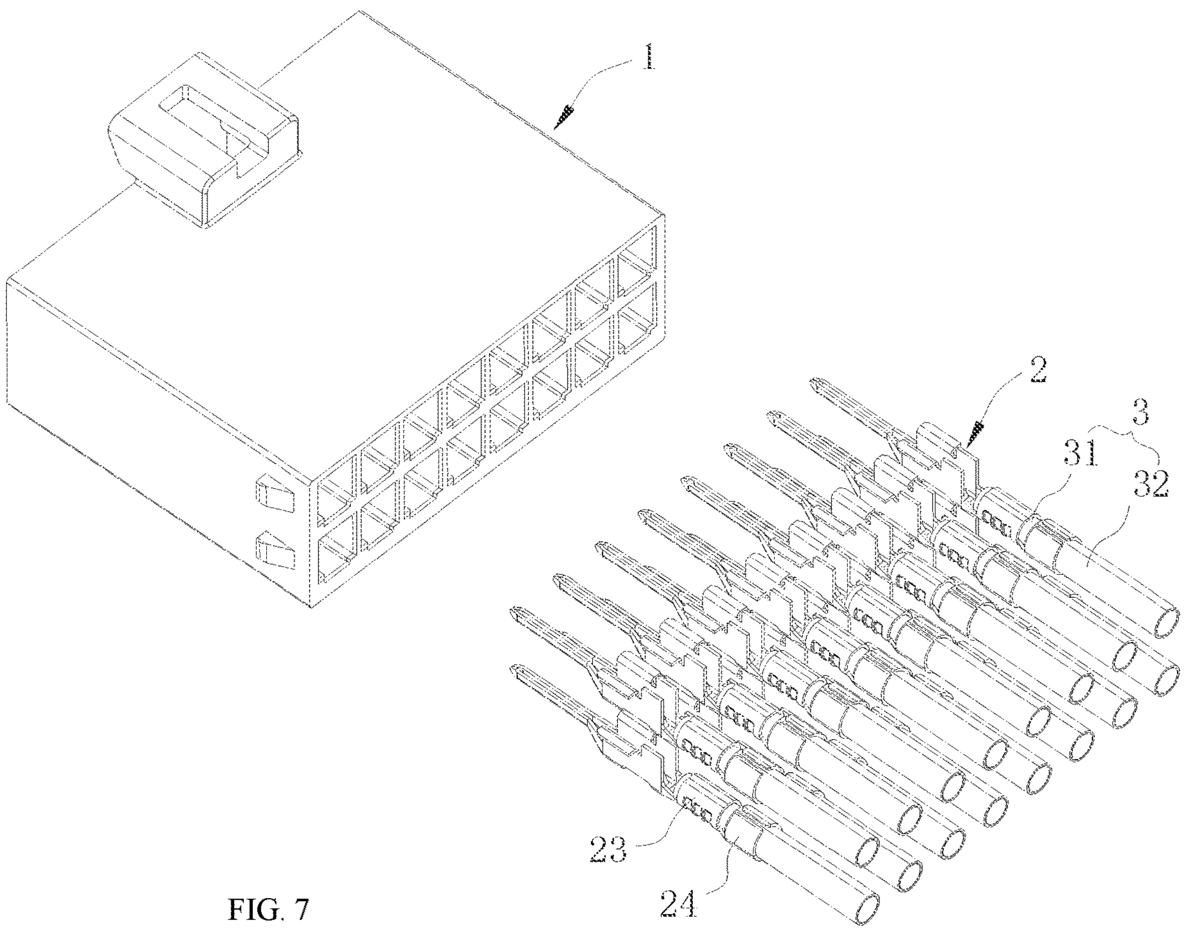
FIG. 7 is an exploded perspective view of FIG. 1.

Referring to FIG. 7, the crimping connection portion 23 and the crimping wire portion 24 both are used to crimp the conductive wire 3. The crimping connection portion 23 is used to crimp an internal conductor 31 of the conductive wire 3. The crimping wire portion 24 is behind the crimping connection portion 23 and is used to crimp an insulative jacket 32 of the conductive wire 3. The crimping connection portion 23 and the crimping wire portion 24 are both formed by stamping the metal plate to be embrace-shaped.

In combination with FIG. 2 to FIG. 6, the plurality of conductive terminals 2 are divided into an upper row and a lower row, are correspondingly mounted in the plurality of terminal receiving cavities 12 of the insulative housing 1 respectively.

The fixing portion 22 of each conductive terminal 2 is used to snap with the insulative housing 1 so as to fix a position of the conductive terminal 2 in the insulative housing 1, the mating portion 21 of each conductive terminal 2 forwardly enters into the mating cavity 121 of the terminal receiving cavity 12 so as to be used to mate with the external mating connector, the crimping connection portion 23 and the crimping wire portion 24 are positioned in the wire connecting cavity 122 of the terminal receiving cavity 12 so as to bring the front end of the conductive wire 3 into the insulative housing 1.

Figure 5:
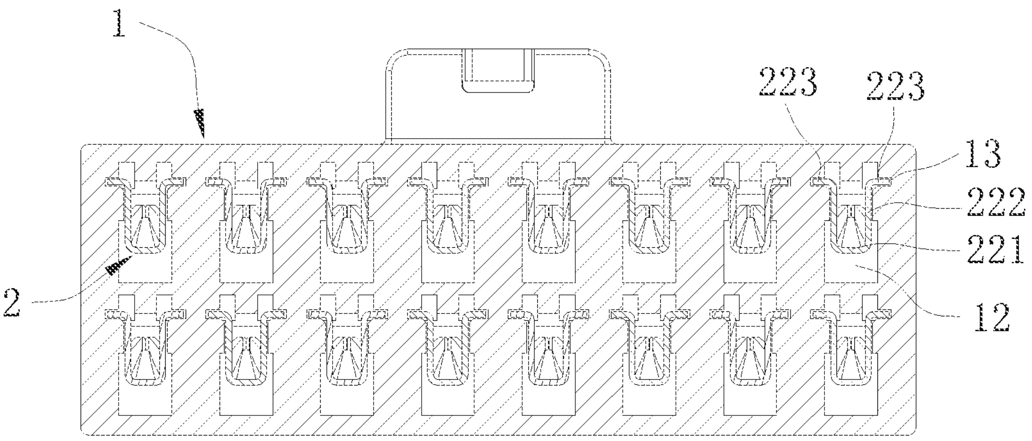
FIG. 5 is a cross sectional view taken along a line C-C of FIG. 3.

Specifically, as shown in FIG. 5, the bottom connecting piece 221 and the two vertical extending pieces 222 of the fixing portion 22 are received in the terminal receiving cavity 12, two side walls of the terminal receiving cavity 12 substantially limit the two vertical extending pieces 222 of the fixing portion 22 in the left-right direction. The two fixing wings 223 at an upper side of the fixing portion 22 respectively correspondingly insert into the two fixing slots 14, see FIG. 4, at the two sides of the terminal receiving cavity 12 from the rear to the front. The fixing wing 223 and the fixing slot 14 are in plane cooperation, which has good cooperation reliability. The two fixing slots 14 respectively limit the two fixing wings 223 to move in the up-down direction and rotate in a vertical plane, the two fixing slots 14 at the two sides of the terminal receiving cavity 12 in the left-right direction cooperate with each other to further limit the two vertical extending pieces 222 to move in the left-right direction, so that stability of a position of the conductive terminal 2 in the insulative housing 1 is promoted. In addition, the two fixing slots 14 are provided close to a top portion of the terminal receiving cavity 12, which makes that a structure of the terminal receiving cavity 12 along the up-down direction is asymmetric to form a foolproof design, the foolproof design may prevent the conductive terminal 2 and the terminal receiving cavity 12 from being wrongly assembled.

Preferably, a thickness of the fixing wing 223 is substantially equal to or slightly smaller than a height of the fixing slot 14, so that the fixing wing 223 may smoothly insert into the fixing slot 14 and be fixed in the fixing slot 14.

Mainly referring to FIG. 6, along the front-rear direction, the front edge of the fixing wing 223 is stopped on the topping wall 13 of the insulative housing 1, so that the conductive terminal 2 is hindered to further forwardly move. Here, because a front end of the fixing wing 223 is provided with the oblique surface 2231, that the front corner of the fixing wing 223 early contacts the stopping wall 13 to result in a mounting position of the conductive terminal 2 inaccurate when the conductive terminal 2 is assembled may be prevented.

Mainly referring to FIG. 3, the elastic fixing arm 16 at the bottom of the terminal receiving cavity 12 snaps with the fixing opening 2211 at a bottom of the fixing portion 22, specifically, the fixing notch 161 of the elastic fixing arm 16 snaps with a front wall of the fixing opening 2211. Thus the elastic fixing arm 16 provides an upward elastic supporting force for the fixing portion 22. At the same time, the elastic fixing arm 16 further stops the fixing portion 22 to move rearwardly, that is, prevents the conductive terminal 2 from being detached rearwardly from the insulative housing 1 when the conductive terminal 2 mates with the mating connector and is subject to a force from the mating connector.

Mainly referring to FIG. 4, the two rear portions 2221 of the two vertical extending pieces 222 correspondingly enter into the two receiving grooves 15 of the terminal receiving cavity 12 at the upper side of the terminal receiving cavity 12 respectively, so that the two receiving grooves 15 limit the two vertical extending pieces 222 to move in the left-right direction, which further promotes stability of the position of the conductive terminal 2.

Based the above description on the structure, when the electrical connector 100 is assembled, firstly the plurality of conductive wires 3 are connected with the plurality of conductive terminals 2 together by one-to one correspondence, in which the internal conductor 31 of the conductive wire 3 enters into the crimping connection portion 23 of the conductive terminal 2, the internal conductor 31 is crimped in the crimping connection portion 23 so as to form an electrical connection by forming the crimping connection portion 23 through stamping, the insulative jacket 32 of the conductive wire 3 is crimped in the crimping wire portion 24 by forming the crimping wire portion 24 through stamping; subsequently the conductive terminal 2 is mounted into the terminal receiving cavity 12 from the rear to the front from behind the insulative housing 1, so that the two fixing wings 223 of the conductive terminal 2 enter into and are fixed in the two fixing slots 14 respectively. In the process that the conductive terminal 2 moves forwardly, the bottom of the fixing portion 22 slidably abuts against the elastic fixing arm 16, the fixing portion 22 applies a downward acting force to the elastic fixing arm 16 so as to press down the front end of the elastic fixing arm 16. When the fixing opening 2211 of the fixing portion 22 reaches above the fixing notch 161, the elastic fixing arm 16 rebounds upwardly, the fixing notch 161 snaps with the fixing opening 2211, at this time, the conductive terminal 2 is mounted in the terminal receiving cavity 12 in place.

According to the above description, in the electrical connector 100, a fixing wing 223 horizontally extends outwardly from each of two sides of the fixing portion 22 of the conductive terminal 2, and the two sides of the terminal receiving cavity 12 of the insulative housing 1 each are correspondingly provided with a fixing slot 14, the fixing wing 223 is fixed in the fixing slot 14, which fixes the position of the conductive terminal 2 in the insulative housing 1, particularly limits that the conductive terminal 2 cannot move in the up-down direction, so that the conductive terminal 2 is prevented from shaking (particularly along the up-down direction) when the conductive terminal 2 mates with the mating connector, stability of the conductive terminal 2 is promoted, reliability of the electrical connector 100 is promoted when the electrical connector 100 mates with the mating connector.

Referring to FIG. 10 to FIG. 13, an electrical connector 100*a* as provided further includes a terminal position assurance member 4 which is mounted behind the insulative housing 1 on a basis of the electrical connector 100 of the previous embodiment.

In the present embodiment, the terminal position assurance member 4 are two in number, the two terminal position assurance members 4 are provided to respectively correspond to the upper row and the lower row of the plurality of conductive terminals 2. Each terminal position assurance member 4 abuts against rear edges of the vertical extending pieces 222 of the conductive terminals 2 which are positioned in the same row, so as to assure that the conductive terminals 2 cannot be rearwardly detached from the insulative housing 1.

Figure 11:
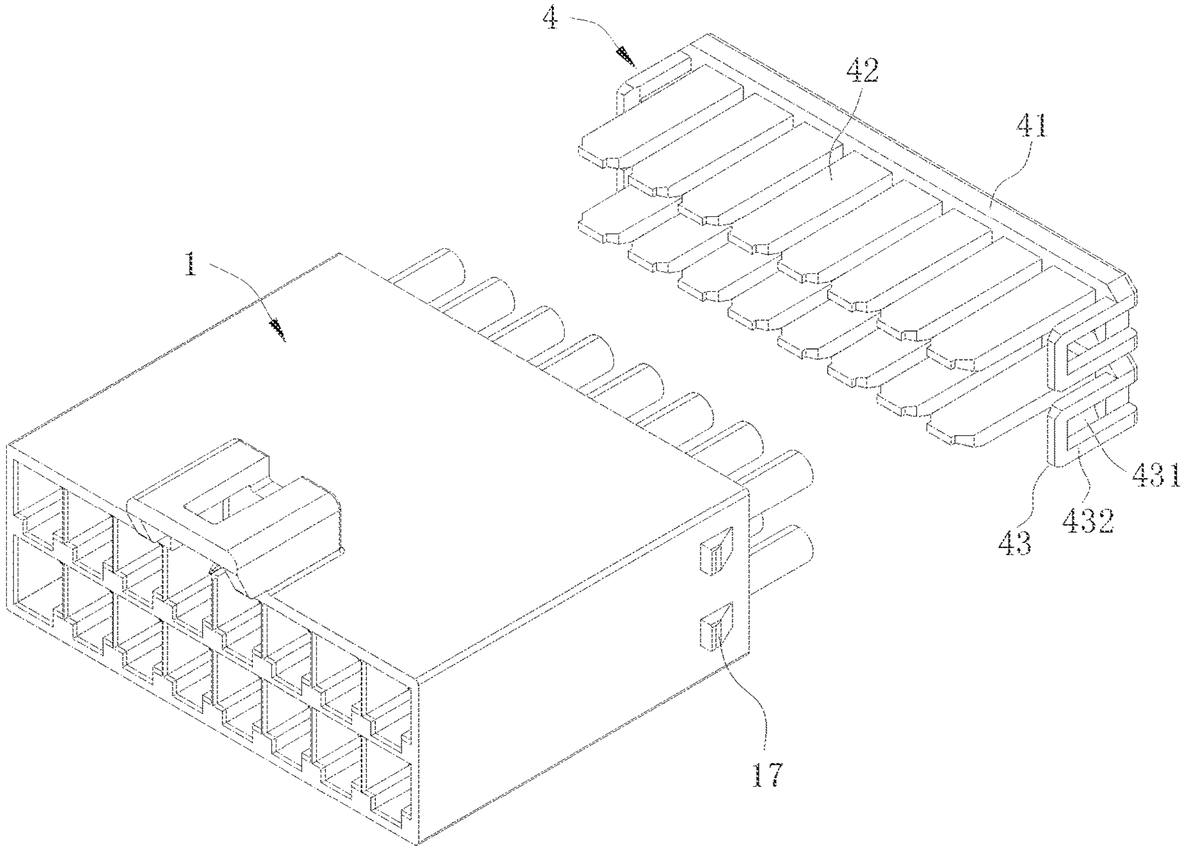
FIG. 11 and FIG. 12 are exploded perspective views of FIG. 10 viewed from different angles.
Figure 12:
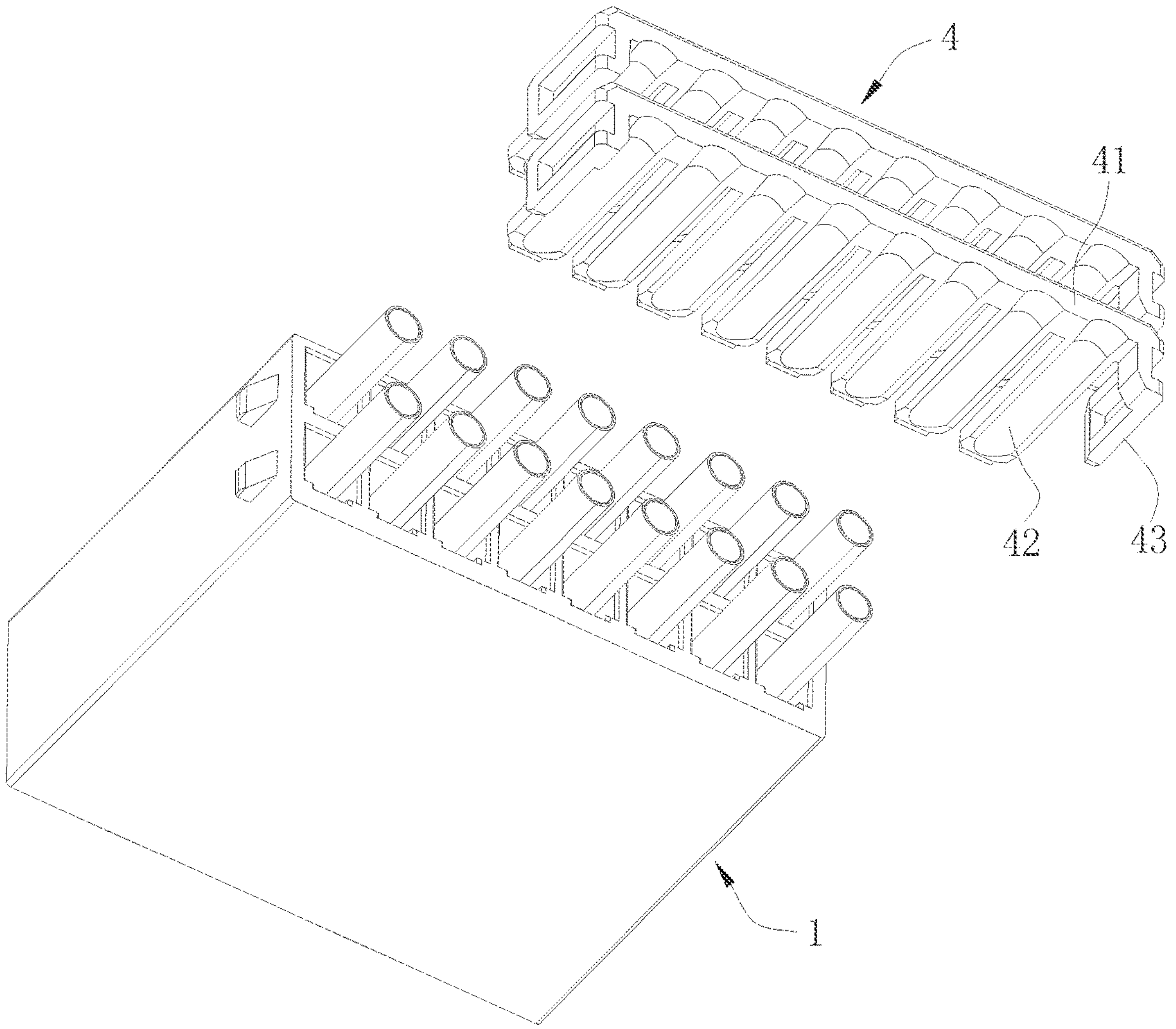
Figure 13:
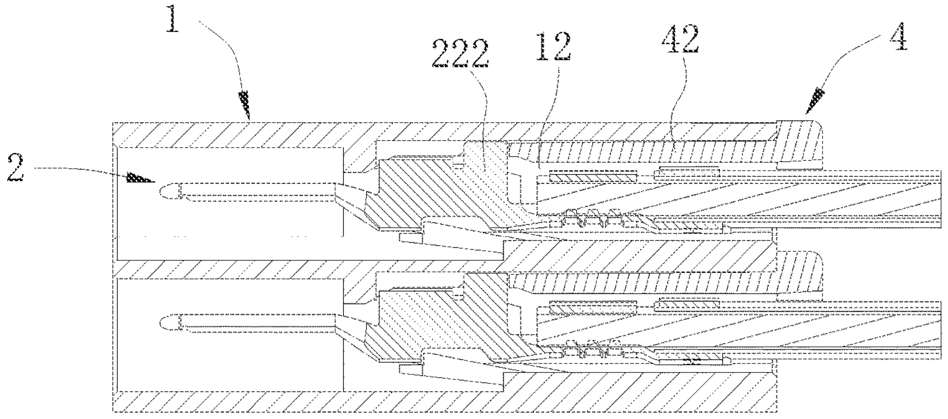
FIG. 13 is across sectional view of FIG. 10.

As shown in FIG. 11 and FIG. 12, the terminal position assurance member 4 includes a base portion 41, terminal abutting portions 42 which extend forwardly from the base portion 41 and two locking portions 43 which extend forwardly from two sides of the base portion 41 respectively. The locking portion 43 downwardly exceeds the base portion 41. In the present embodiment, the locking portion 43 is an elastic locking arm 432 in which a middle portion of the elastic locking arm 432 is provided with a latching groove 431. In other embodiments not shown, the locking portion 43 also may be an elastic locking arm in which a latching hook is provided to protrude inwardly.

Corresponding to each terminal position assurance member 4, the two sides of the insulative housing 1 each are provided with a latching portion 17 which protrudes outwardly, in the present embodiment, the latching portion 17 is a latching protrusion, in other embodiments not shown, the latching portion 17 also may be a latching groove.

Again referring to FIG. 10 and FIG. 13, the terminal position assurance member 4 is mounted to a rear end of the insulative housing 1, the base portion 41 abuts against the rear end surface of the insulative housing 1, the two locking portions 43 correspondingly lock with the two latching portions 17 of the insulative housing 1, so that the terminal position assurance member 4 is fixed on the insulative housing 1. Each terminal abutting portion 42 extends into the corresponding terminal receiving cavity 12 and forwardly abuts against the rear edges of the two vertical extending pieces 222 of the conductive terminal 2. In the electrical connector 100*a* of the present preferred embodiment, with the terminal position assurance member 4, the conductive terminal 2 may be prevented from withdrawing, an acting force subjected by the conductive terminal 2 when the conductive terminal 2 mates with the mating connector is efficiently resisted, stability of the position of the conductive terminal 2 is further promoted, so that mating reliability is promoted.

In other embodiments not shown, the two terminal position assurance members 4 also may be incorporated as one terminal position assurance member 4.

The above described contents are only the preferred embodiments of the present disclosure, which cannot limit the implementing solutions of the present disclosure, those skilled in the art may conveniently make corresponding variation or modification based on the main concept and spirit of the present disclosure, therefore the extent of protection of the present disclosure shall be determined by terms of the claims.

What is claimed is:

1. An electrical connector, comprising:

an insulative housing, an interior of the insulative housing being provided with a plurality of terminal receiving cavities which penetrate along a front-rear direction, two sides of each terminal receiving cavity being provided with a fixing slot respectively;

a plurality of conductive terminals respectively mounted in the terminal receiving cavities; each conductive terminal comprising a fixing portion, a mating portion which extends forwardly from the fixing portion and a crimping connection portion and a crimping wire portion which extend rearwardly from the fixing portion; two sides of the fixing portion each being provided with a vertical extending piece which extends upwardly, a fixing wing horizontally bending outwardly from an upper end of each vertical extending piece, the fixing wing being correspondingly fixed in the fixing slot.

2. The electrical connector according to claim 1, wherein the fixing slot extends horizontally, a rear end of the fixing slot and a side of the fixing slot toward the other fixing slot are opened, the fixing wing is inserted into the fixing slot from the rear to the front.

3. The electrical connector according to claim 1, wherein the fixing wing bends from a front portion of the vertical extending piece, a rear portion of the vertical extending piece continuously extend vertically and upwardly, an upper edge of the rear portion of the vertical extending piece is higher than an upper surface of the fixing wing.

4. The electrical connector according to claim 3, wherein the insulative housing is provided with two receiving grooves at an upper side of the terminal receiving cavity, the rear portions of the two vertical extending pieces correspondingly enter into the two receiving grooves.

5. The electrical connector according to claim 4, wherein a front edge of the fixing wing is stopped to the insulative housing, a rear edge of the vertical extending piece is abutted against by a terminal position assurance member which is mounted behind the insulative housing.

6. The electrical connector according to claim 5, wherein two sides of the insulative housing each are provided with a latching portion which protrudes outwardly;

the terminal position assurance member comprises a base portion, terminal abutting portions which extend forwardly from the base portion and two locking portions which extend forwardly from two sides of the base portion;

the locking portion correspondingly locks with the latching portion;

the terminal abutting portion extends into the terminal receiving cavity and forwardly abuts against the rear edge of the vertical extending piece.

7. The electrical connector according to claim 1, wherein the mating portion comprises two mating arms which respectively extend forwardly from the two vertical extending pieces, each mating arm obliquely bends from the vertical extending piece toward the other mating arm firstly and then extends forwardly in parallel with the other mating arm, a tip of each mating arm is further provided with a guiding distal end which extends obliquely toward the other mating arm.

8. The electrical connector according claim 1, wherein the fixing portion is U-shaped, the two vertical extending pieces at the two sides of the fixing portion face each other and are spaced apart from each other, the two fixing wings oppositely bend outwardly and away from each other from the upper ends of the two vertical extending pieces.

9. The electrical connector according to claim 8, wherein a bottom of the fixing portion is provided with a fixing opening, the insulative housing is provided with an elastic fixing arm which correspondingly protrudes upwardly at a bottom of the terminal receiving cavity, the elastic fixing arm snaps with the fixing opening.

10. The electrical connector according to claim 9, wherein the elastic fixing arm obliquely extends upwardly from the rear to the front, a rear end of the elastic fixing arm and a lower wall of the terminal receiving cavity are jointed together, a front end of the elastic fixing arm is cantilevered in the terminal receiving cavity, the front end of the elastic fixing arm is provided with a fixing notch which correspondingly snaps with the fixing opening.

* * * * *